Jan. 20, 1970  R. C. MOTT ET AL  3,490,479
FLUID PRESSURE RELAY
Filed July 12, 1968
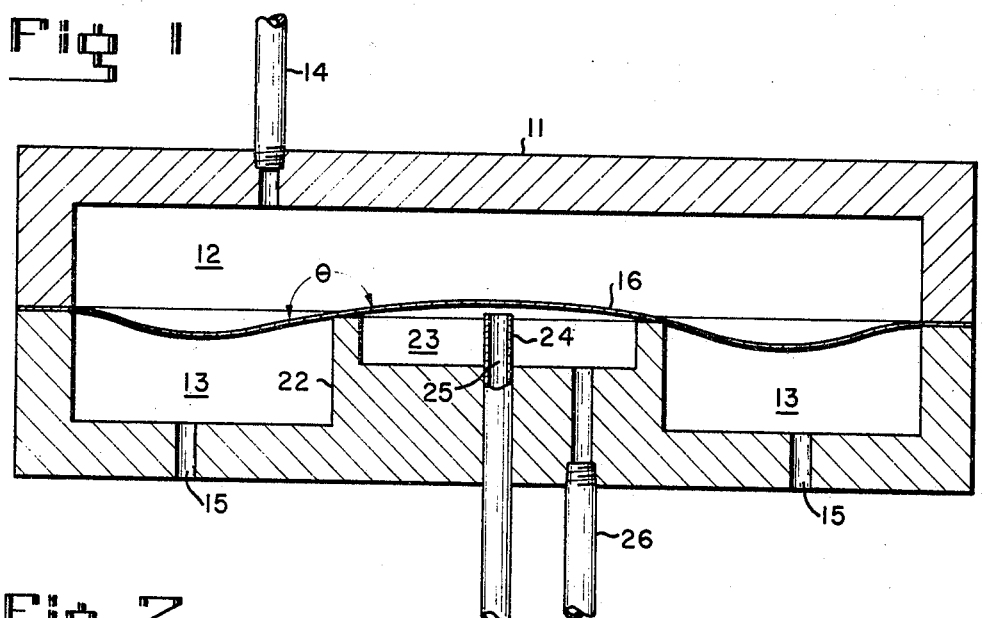
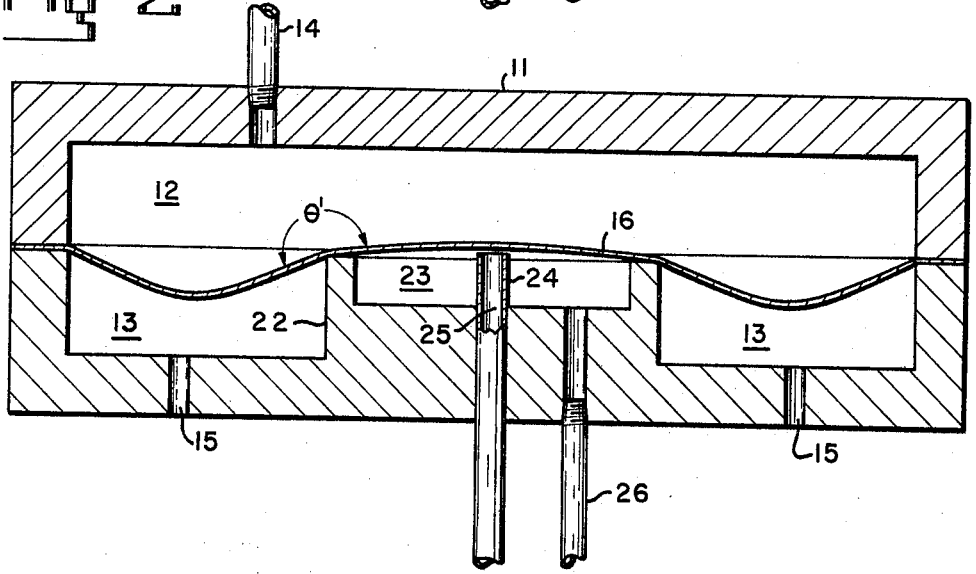
INVENTOR.
JOSEPH E. HOGEL
RICHARD C. MOTT
BY
ATTORNEY.

United States Patent Office 3,490,479
Patented Jan. 20, 1970

3,490,479
FLUID PRESSURE RELAY
Richard C. Mott, Harwood Heights, and Joseph E. Hogel, River Grove, Ill., assignors to Honeywell Inc., Minneapolis, Minn., a corporation of Delaware
Filed July 12, 1968, Ser. No. 744,412
Int. Cl. F15b *5/00;* G05d *16/06;* F15c *3/04*
U.S. Cl. 137—82                                6 Claims

ABSTRACT OF THE DISCLOSURE

A pneumatic high gain amplifying relay employing a slack diaphragm that operates in conjunction with dual concentric nozzles, the largest of which is connected to a source of supply pressure. In response to a given input signal pressure, the slack diaphragm seals the outer nozzle to prevent bleeding of the supply pressure and thereby establish a maximum output pressure through the smaller nozzle. As the input signal pressure increases, the slack diaphragm seals the inner nozzle in a modulating manner to establish an output pressure that varies inversely with the input pressure.

BACKGROUND OF THE INVENTION

The field of pneumatic logic has recently experienced a trend to miniaturized devices employing diaphragms to perform switching functions. In the development of this field, there has arisen a need for a linear amplifying relay using diaphragm logic principles that would provide a pneumatic function equivalent to that of the electronic operational amplifier. This invention was the result of the work in the development of such devices.

SUMMARY OF THE INVENTION

The inventive concept lies in the use of a diaphragm that operates in sealable relation with dual concentric nozzles. In response to a variable input pressure, an output pressure can be established that has a very high negative gain characteristic. The inventive concept can easily be incorporated into a miniaturized device, and by virtue of the inherent feedback of the dual nozzle structure the device performs in a stable, linear manner.

DESCRIPTION OF THE DRAWINGS

FIGURE 1 is a cross-sectional view of the preferred embodiment showing a slack diaphragm operating in sealable relation with dual concentric nozzles.

FIGURE 2 discloses a preferred embodiment with the slack diaphragm in a different operating position.

DESCRIPTION OF THE PREFERRED EMBODIMENT

FIGURE 1 discloses a housing 11 divided into a signal presure chamber 12 and an exhaust chamber 13 by means of a slack diaphragm 16. Chamber 12 is provided with an input tube 14 while chamber 13 includes atmospheric vents 15, 15. Disposed in exhaust chamber 13 is an outer nozzle 22 and an inner nozzle 24 arranged in a concentric manner. These nozzles are circular in shape and operate in sealable relation with the slack diaphragm 16 to define nozzle chambers 23, 25 respectively. Nozzle chamber 23 is adapted for connection with a source of supply pressure, not shown, by means of an inlet 26. Nozzle chamber 25 provides the output pressure and can be connected to a desired pressure responsive device.

For a selected range of input pressures, the structure is capable of providing an output pressure that varies inversely with a variable input pressure. As the input pressure to chamber 12 increases from a zero value, that portion of slack diaphragm 16 outside nozzle 22 is forced downward until it comes into contact with and seals nozzle 22. As FIGURE 1 shows, this occurs when the slack diaphragm 16 is actually forced below the level of nozzle 22. At the input pressure at which nozzle 22 seals, nozzle 24 remains open by virtue of the supply pressure under the diaphragm 16 in chamber 23, causing curvature at the center of slack diaphragm 16. Hence, the output pressure in chamber 25 is equal to the supply pressure. This marks the point at which the device begins its reverse acting operation.

As the input pressure to chamber 12 is further increased, nozzle 24 is modulated to a closed position by the increased control pressure acting on the top of diaphragm 16 coupled with a tensile force exerted radially outward in diaphragm 16. The supply pressure is thus throttled more and more until the output pressure in chamber falls to zero, thereby completing the reverse acting operation.

The device exhibits a linear transfer characteristic as a result of inherent feedback, which is believed to be due to the following phenomenon. When the pressure in chamber 12 is low the diaphragm convolution is relatively slight, and the angle $\theta$ that diaphragm 16 makes about the top edge of nozzle 22 is essentialy 180° as shown in FIGURE 1. Hence, the radial force exerted outwardly in diaphragm 16 is highly efficient in pulling the diaphragm more taut over the nozzle 25. As pressure in the chamber 12 increases, the diaphragm convolution becomes deeper, and the angle $\theta'$ formed by the diaphragm 16 with respect to nozzle 22 becomes greater than 180°, as shown in FIGURE 2. In this case, the outward radial force existing in the diaphragm outside nozzle 22 is less efficient because it is not exerted in a direct line with that portion of diaphragm 16 inside nozzle 22. Accordingly, it is believed that the linearily is due to a change in how efficiently the diaphragh area outside nozzle 22 is used, and that this efficiency is lowest at the highest control pressures.

If the distance nozzle 24 extends beyond the top of nozzle 22 is varied, the pressure swing through which the throttling range occurs similarly changes, thus changing the gain characteristics of the device. As an example, for a device where chamber 12 is 2 inches in diameter, nozzle 22 is .5 inch in diameter, nozzle 24 is .065 inch in diameter and the distance that nozzle 24 extends beyond nozzle 22 is .010 inch, the gain for an output pressure swing of 3 p.s.i. to 13 p.s.i. is approximately 30. By extending the nozzle extension distance to .050 inch, the gain through the same pressure range is increased to approximately 200.

The embodiments of the invention in which an exclusive property or right is claimed are defined as follows:
1. The fluid pressure relay comprising:
   a first chamber defined in part by diaphragm means and adapted to receive a variable input pressure;
   first nozzle means disposed outside the first chamber and acting in sealable relation with the diaphragm means to form a first nozzle chamber adapted for connection with a source of supply pressure;
   second nozzle means acting in sealable relation with the diaphragm means to form a second nozzle chamber, the second nozzle means disposed within the first nozzle chamber and adapted to control an output pressure;
   the first and second nozzle means constructed and arranged so that for an increase in input pressure the diaphragm means sequentially seals the first nozzle means and the second nozzle means.
2. A fluid pressure relay as defined by claim 1 and further comprising a second chamber communicating with ambient pressure and disposed adjacent the first chamber so that the two chambers are separated by the diaphragm means, the first and second nozzle means being disposed in the second chamber.

3. A fluid pressure relay as defined by claim 1 wherein the second nozzle means extends beyond the first nozzle means.

4. A fluid pressure relay as defined by claim 1 wherein the first and second nozzles are circular.

5. A fluid pressure relay as defined in claim 1 wherein the first and second nozzles are concentric.

6. A fluid pressure relay as defined by claim 1 wherein the diaphragm means is a slack diaphragm.

References Cited

UNITED STATES PATENTS 2,677,390  5/1954  Davis _____ 251—61.1 X
3,210,987  10/1965  Bruns _____ 137—82 X ALAN COHAN, Primary Examiner U.S. Cl. X.R.

137—625.12; 251—61.1